(12) United States Patent
Masseboeuf et al.

(10) Patent No.: US 9,490,091 B2
(45) Date of Patent: Nov. 8, 2016

(54) TRIP CAUSE MANAGEMENT DEVICE FOR AN ELECTRONIC TRIP DEVICE

(71) Applicant: SCHNEIDER ELECTRIC INDUSTRIES SAS, Rueil-Malmaison (FR)

(72) Inventors: Bertrand Masseboeuf, Beaucroissant (FR); Joel Sorin, Domene (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 53 days.

(21) Appl. No.: 14/665,387

(22) Filed: Mar. 23, 2015

(65) Prior Publication Data
US 2015/0270083 A1 Sep. 24, 2015

(30) Foreign Application Priority Data
Mar. 24, 2014 (FR) ...................................... 14 00710

(51) Int. Cl.
| H02H 3/08 | (2006.01) |
| H01H 71/04 | (2006.01) |
| H02H 1/00 | (2006.01) |
| H02H 1/06 | (2006.01) |
| H02H 3/04 | (2006.01) |
| H02H 3/05 | (2006.01) |

(52) U.S. Cl.
CPC ........... *H01H 71/04* (2013.01); *H02H 1/0092* (2013.01); *H02H 1/06* (2013.01); *H02H 3/04* (2013.01); *H02H 3/05* (2013.01); *H01H 2071/042* (2013.01)

(58) Field of Classification Search
USPC ...................................................... 361/93.2
See application file for complete search history.

(56) References Cited

U.S. PATENT DOCUMENTS

| 5,089,928 A | | 2/1992 | Durivage, III et al. |
| 5,224,011 A | | 6/1993 | Yalla et al. |
| 5,311,392 A | | 5/1994 | Kinney |
| 5,335,135 A | | 8/1994 | Kinney |
| 5,506,485 A | * | 4/1996 | Mueller ................. H02H 3/006 318/600 |
| 2002/0085326 A1 | | 7/2002 | Kim et al. |
| 2003/0048006 A1 | * | 3/2003 | Shelter, Jr. ............. H02J 9/061 307/64 |
| 2009/0051557 A1 | * | 2/2009 | Beatty .................... H01H 9/167 340/639 |
| 2014/0149809 A1 | * | 5/2014 | Bisht .................. G05B 19/0428 714/55 |
| 2015/0270083 A1 | * | 9/2015 | Masseboeuf ........... H01H 71/04 361/93.2 |

FOREIGN PATENT DOCUMENTS

| EP | 0 279 692 A2 | 8/1988 |
| WO | WO 2008/054806 A2 | 5/2008 |

* cited by examiner

*Primary Examiner* — Ronald W Leja
(74) *Attorney, Agent, or Firm* — Oblon, McClelland, Maier & Neustadt, L.L.P.

(57) ABSTRACT

A management device (1) of the causes of tripping in an electronic trip device enabling operation to take place in efficient and dependable manner by means of an architecture with three microcontrollers. The first microcontroller (3), second microcontroller (4) and third microcontroller (5), connected to one another, perform analysis and storage of characteristics typical to the electric power system (2) measured by the first microcontroller (3). Depending on the power supply situations and the analyzed events, one, two or three microcontrollers can be active to reduce the electric power requirements of the device (1). Storage of the data concerning the electric power system (2) is at least partially performed in redundant manner.

10 Claims, 6 Drawing Sheets

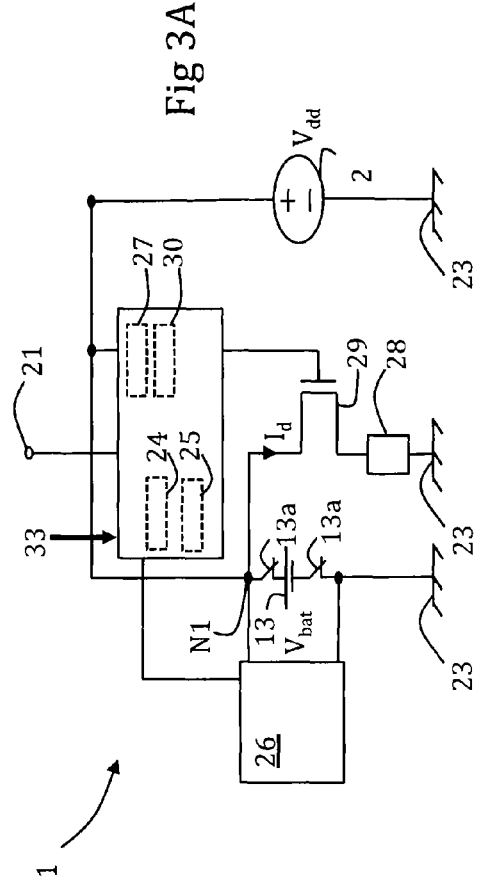
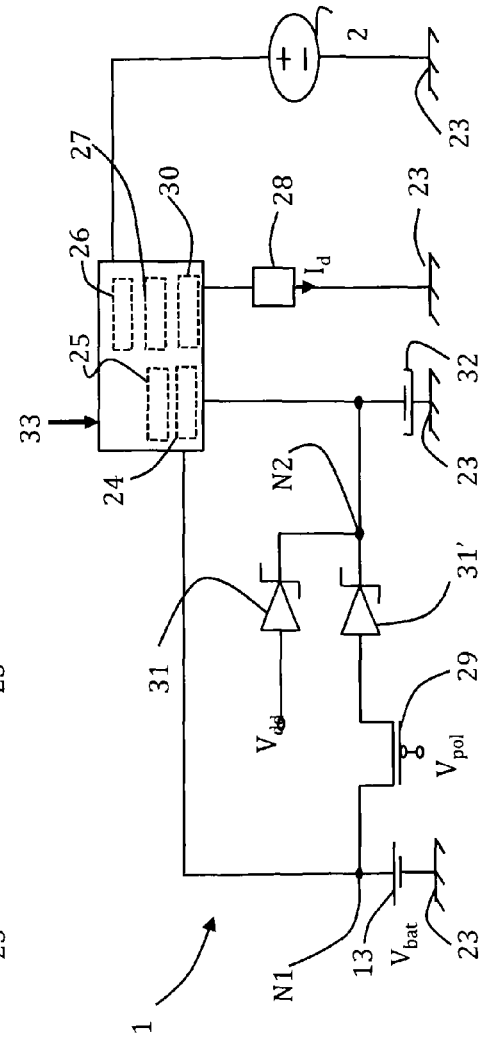

TRIP CAUSE MANAGEMENT DEVICE FOR AN ELECTRONIC TRIP DEVICE

BACKGROUND OF THE INVENTION

The invention relates to a management device of the causes of tripping in a circuit breaker.

STATE OF THE ART

After tripping of an electronic circuit breaker, it is important to keep the information concerning the cause of tripping. It is also important to keep some information on the events which took place just before tripping.

In traditional manner, the information related to the cause of tripping is generated by means of a microprocessor which stores this data on memory devices. The microprocessor also performs storage of the data concerning the electric quantities before and at the time of tripping. A heavy power demand is placed on the microprocessor during data storage which requires the use of a microprocessor of large size.

Several documents dealing with this issue exist. For example, the document EP0279692 describes a circuit interrupter with a fault indicator. The data concerning the state of the monitored power supply just before the fault is stored by a single microprocessor.

For the sake of simplicity, the circuit breaker is supplied directly by the line to be monitored. In this configuration, when tripping occurs, the circuit breaker is no longer powered-on.

The document U.S. Pat. No. 5,089,928 describes a circuit breaker using a micro-computer for monitoring a circuit and for storing data concerning the monitored circuit.

The document U.S. Pat. No. 5,311,392 discloses a circuit breaker equipped with two processors to monitor a power supply circuit. The processors are powered in independent manner so that a second processor also operates when the power supply of the first processor is interrupted. The first processor has access to more information than the second processor.

The document U.S. Pat. No. 5,224,011 discloses a system where a battery is used to perform data storage in an electric circuit in case of unavailability of the main power supply.

OBJECT OF THE INVENTION

It is observed that a requirement exists to provide a circuit breaker providing information on the causes of tripping in a more efficient and more dependable manner.

This object is achieved by a circuit breaker comprising:
a series of inputs designed to be connected to a first microcontroller configured to measure characteristics of an electric current of a power supply line to detect an electric fault of the power supply line,
a second microcontroller supplied by said power supply line and presenting a first electricity consumption value, the second micro-controller being configured to analyse data coming from the first micro-controller in order to detect an electric fault of the power supply line,
a third microcontroller supplied by said power supply line and connected so as to receive data from the first and second microcontrollers, the third microcontroller being configured to indicate the cause of tripping of the circuit breaker, the third microcontroller presenting a second electricity consumption value that is lower than the first electricity consumption value,
a back-up power supply source configured to supply the third micro-controller in case of unavailability of the power supply line.

BRIEF DESCRIPTION OF THE DRAWINGS

Other advantages and features will become more clearly apparent from the following description of particular embodiments of the invention given for non-restrictive example purposes only and represented in the appended drawings, in which:

FIGS. 3A and 3B represent two embodiments of a circuit breaker in schematic manner.

DETAILED DESCRIPTION

Figure 1A:
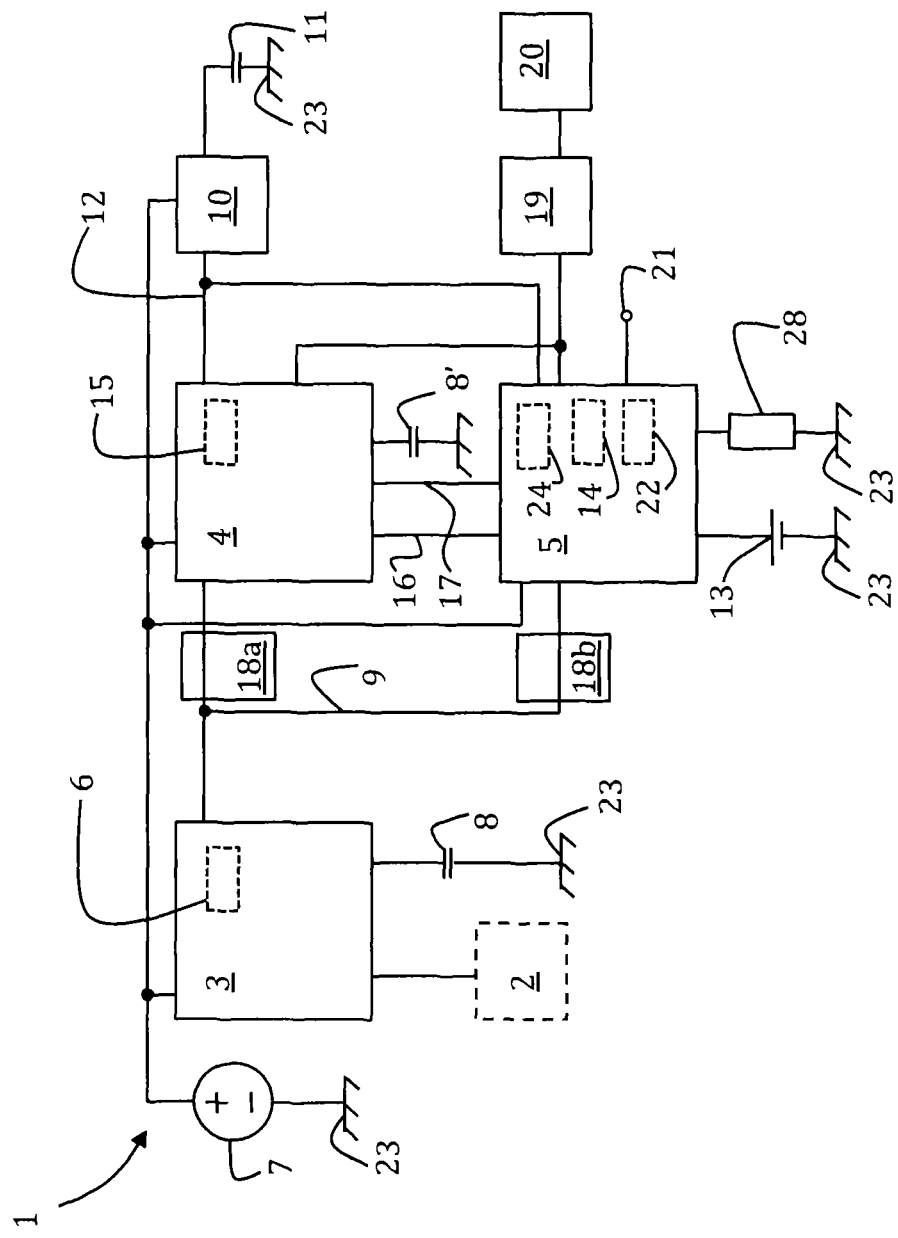
FIG. 1A illustrates a first embodiment of a circuit breaker in schematic manner.
Figure 1B:
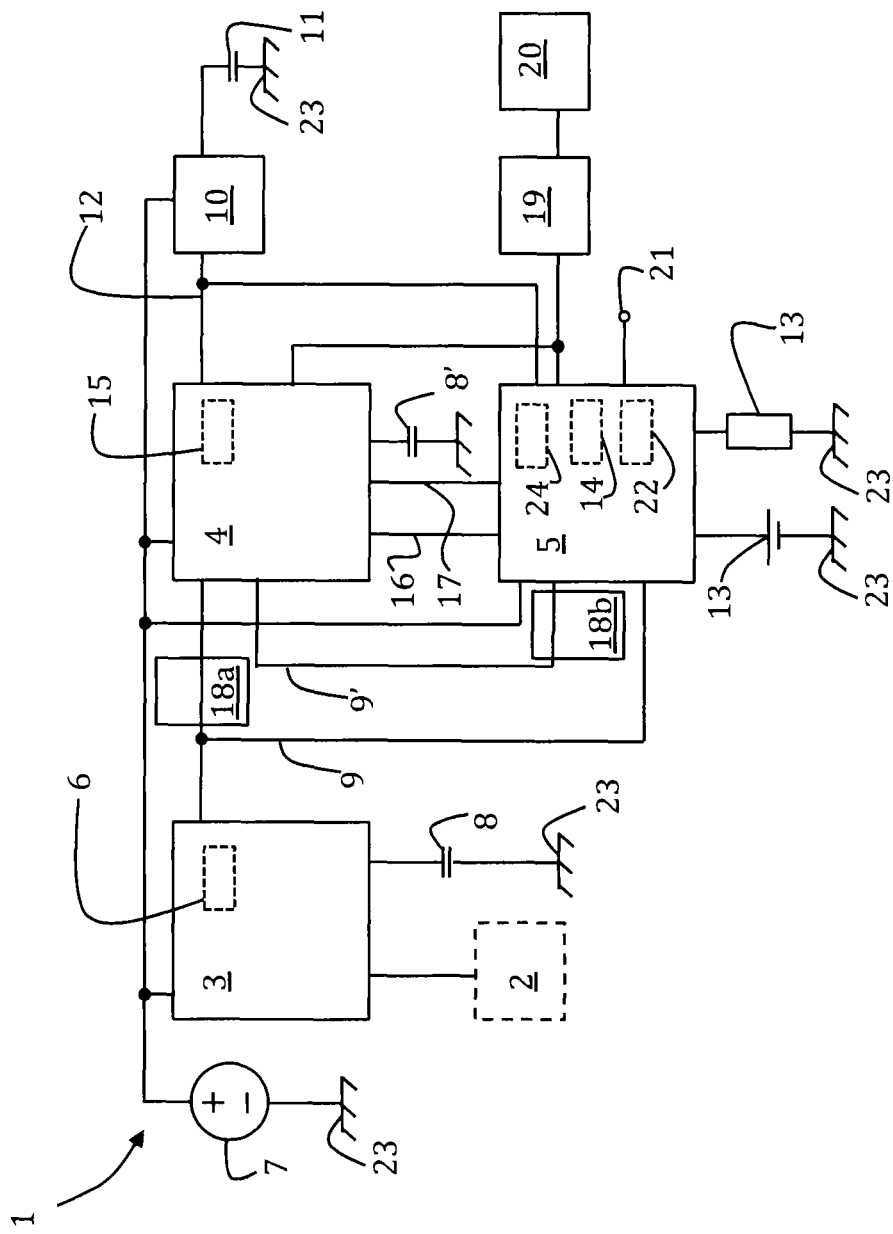
FIG. 1B illustrates a second embodiment of a circuit breaker in schematic manner.

FIGS. 1A and 1B show a monitoring device 1 of electric power supply lines of an electric power system 2. In advantageous manner, monitoring device 1 forms part of a circuit breaker connected to one or more electric power supply lines of electric power system 2. The monitoring device analyses these lines in order to determine whether they are operating normally or malfunctioning. The circuit breaker is configured to analyse the electric characteristics of the power supply line to be monitored by means of micro-controllers and to trigger disconnection of this power supply line if an electric fault is detected. Device 1 can comprise a first microcontroller 3, a second microcontroller 4 and a third microcontroller 5 the specificities of which will be defined further on. As a variant, first microcontroller 5 is located outside monitoring device 1 but it is connected to a series of inputs of device 1 so as to provide data on electric quantities representative of electric power system 2 to the latter.

First microcontroller 3 is connected to the power supply line of electric power system 2. First microcontroller 3 is equipped with measuring means 6 to measure quantities characteristic of electric power system 2 (step F1), such as for example the voltage V, current I and frequency f. First microcontroller 3 can be integrated in the circuit breaker or be located outside the circuit breaker. First microcontroller 3 is also configured to monitor electric power system 2 and to detect a possible fault.

In an advantageous embodiment, first microcontroller 3 is electrically supplied by a primary power supply 7 which is provided by the electric line to be monitored. This primary power supply 7 is the main electric power source of first microcontroller 3. As power supply of the circuit breaker and more particularly of monitoring device 1 is performed by electric power system 2 or is branched off from this power system 2, in case of tripping of the circuit breaker the primary power supply line is interrupted and first microcontroller 3 is no longer powered-on. Furthermore, the power delivered by primary power supply 7 can vary according to the electric load connected to the electric power system.

A back-up electric power supply source is provided by a first electric capacitor 8 to supply first microcontroller 3 during a limited time, when its primary power supply 7 is interrupted. In this way, when the tripping order is sent to the circuit breaker or when first microcontroller 3 detects loss of the primary power supply, there is enough energy remaining in capacitor 8 to perform transfer of the relevant data to the other components of the circuit breaker. This back-up power supply 8 allows recording of the important electric data when an electric fault is detected on the power supply line.

First microcontroller 3 can detect a fault of the electric power system and trigger disconnection of the electric power system. Data concerning electric power system 2 and more particularly the monitored line is communicated to different components of the circuit breaker via a first communication line 9 from first microcontroller 3.

In a particular embodiment illustrated in FIGS. 1A and 1B, a second micro-controller 4 is connected to first microcontroller 3 by means of first communication line 9. In this way, second microcontroller 4 receives data concerning electric power system 2 via first microcontroller 3. Second micro-controller 4 can also receive data concerning electric power system 2 from other devices of the monitoring device. These other devices provide measurements of the electric quantities of the electric power system.

The main function of second microcontroller 4 is to analyse and store the data concerning electric power system 2. Second microcontroller 4 performs a more in-depth analysis of the measured electric quantities which enables a more detailed study of the electric power system to be made (step F2). In this configuration, second microcontroller 4 can request disconnection of the power supply system for problems not detected by first microcontroller 3, for example a voltage drop below a threshold and/or an abnormal frequency change. Second microcontroller 4 is also configured to perform more precise analyses of the electric characteristics of the line to be monitored, for example voltage, frequency and/or harmonics measurements, and to transmit this data to the user and/or to other computation modules.

For an in-depth analysis of the data concerning electric power system 2, second microcontroller 4 needs a large quantity of electric power. This power can also be used to transmit the collected data to other computation modules or to the user. For its power supply, second microcontroller 4 is connected to primary power supply 7. In advantageous manner, second microcontroller 4 is supplied by means of a DC/DC power supply which is itself supplied by primary power supply 7. As previously, in case of malfunctioning of the electric power system or if primary power supply 7 cannot supply the necessary power, second microcontroller 4 is no longer able to function.

A back-up second electric power source is provided by a second capacitor 8' to supply second microcontroller 4 during a limited time when its primary power supply 7 is interrupted. In this way, when the tripping order of the circuit breaker is sent or when second microcontroller 4 detects loss of the primary power supply, there is enough energy remaining in capacitor 8' to allow transfer the relevant data to the other components of the circuit breaker.

Second microcontroller 4 is connected to a memory 10. Memory 10 is advantageously supplied by means of primary power supply 7. In case of malfunctioning of primary power supply 7, it is advantageous to connect memory 10 to a back-up power supply source which is formed by a capacitor 11 to provide the electric power during a limited time. In this way, the data calculated by second microcontroller 4 can be recorded in memory 10.

Memory 10 is advantageously of electrically erasable and programmable non-volatile memory type or of random access memory with permanent magnetic recording type or other enabling the data to be written easily and to be kept even without any electric power supply. A user can then read the recorded data.

Data transfer between second microcontroller 4 and memory 10 is performed by means of a second communication line 12. Typically, the stored data originates from analysis of the information concerning electric power system 2. For example, the data concerns a variation with time and/or one-time values of current I, of voltage V or of frequency f of an alternating current present in electric power system 2.

In advantageous manner, second microcontroller 4 is configured to perform computations of harmonics which requires execution of computations of Fourier transforms which are extremely power-consuming.

A third microcontroller 5 is present and connected to second microcontroller 4 with a protocol enabling data transfer in both directions. For its power supply, third microcontroller 5 is connected to primary power supply 7. In advantageous manner, third microcontroller 5 is connected to the same power supply as second microcontroller 4, for example by means of the DC/DC converter.

Advantageously, third microcontroller 5 is associated with a back-up electric power supply 13, which is a source independent from electric power system 2. This power source can for example be a battery 13. Battery 13 is an electrochemical device which converts chemical energy into electric energy by means of a redox chemical reaction. Battery 13 can be non-rechargeable and be referred to as a disposable battery or electric battery. A battery is advantageous compared with a capacitor as it is more easily replaceable in case of malfunctioning.

In case of unavailability of primary power supply 7, third microcontroller 5 is supplied by battery 13. Battery 13 is configured with third microcontroller 5 so that third microcontroller 5 is powered-on for a longer time than the first and second microcontrollers in case of unavailability of the primary power supply. Preferably, battery 13 is configured with third microcontroller 5 to supply a permanent power supply of third microcontroller 5. What is meant by permanent power supply is providing the power supply of third micro-controller 5 over a markedly longer period than the time required for a maintenance operation so that the primary power supply is re-established before the battery power has run out. To obtain such a result, third microcontroller 5 presents reduced functionalities consuming little power. Third microcontroller 5 presents functionalities of presentation of the data computed in the first and/or second microcontrollers. Third microcontroller 5 presents an electricity consumption that is lower than the electricity consumption of second microcontroller 4. For example, third microcontroller 5 is not provided with Fourier transform computation means. This results in the second microcontroller presenting a higher electricity consumption than the electricity consumption of the third microcontroller.

Such a configuration enables second microcontroller 4 to be dedicated to high power-consuming operations in order to perform fine analysis of the electric power system from the data provided by first microcontroller 3 and/or by other devices supplying measurements of electric quantities of electric power system 2, and also advantageously enables transmission of all or part of this data to the user or to other components of the circuit breaker.

Third microcontroller 5 is dedicated to communication operations of the data on the causes of tripping in particular with the user, which requires less power. Advantageously, the third microcontroller performs display of the causes of tripping. After tripping of the circuit breaker, it is no longer necessary to analyse the electric power system which is interrupted, but it is however important to know the reasons that caused the tripping and therefore shutdown of the power supply by the power system. It is therefore not necessary to maintain operation of second microcontroller 4 and on the contrary it is important to supply third microcontroller 5 to collect the relevant data and make it available.

Dissociation of the functionalities between two microcontrollers having different electricity consumptions makes it possible to perform all the desired functions when the primary power supply is present and to ensure that the relative data is provided after disconnection over a period of time which may be long. This particularity also enables a compact and robust device to be provided as it is no longer necessary to provide a back-up power supply which supplies all the components of the circuit breaker.

Capacitors 8 and 8' perform power supply of first and second micro-controllers 3 and 4 during a short time period so as to be able to record the electric characteristics of the power system before and just after disconnection. This data is recorded in memory 10. As memory 10 is also supplied by a back-up power supply source 11 of capacitor type, third micro-controller 5 is able to retrieve this data.

As the microcontrollers are supplied by primary power supply 7, the latter may not be able to deliver a power necessary for correct operation of second microcontroller 4. This scenario can occur when there is only a small load on the electric line or if an earth fault occurs. If a fault is detected by first micro-controller 3, the latter informs third microcontroller 5 and the data is stored without second microcontroller 4 intervening in the case where a direct communication line exists between first microcontroller 3 and third micro-controller 5.

Advantageously, third microcontroller 5 has first analysis means 14 configured to analyse characteristics of the electric power system and advantageously to analyse strong currents I and high voltages V of electric power system 2. This data can easily be calculated and the computations only consume little energy. Third microcontroller 5 may be used to detect a malfunction in the electric power system (step F3).

Advantageously, second microcontroller 4 for its part has second analysis means 15 configured to only analyse weak or strong currents I and high voltages V that are present on electric power system 2. Preferably, the analyses performed by second microcontroller 4 originate from data provided by first microcontroller 3 or by other devices which provide measurements on the electric quantities of electric power system 2. In this case, there is no risk of overvoltage tripping and third microcontroller 5 can also be configured to perform the appropriate analyses of the power system. This configuration makes it possible to have a circuit breaker which is functional over a wider current range I.

In order to facilitate data retrieval in third microcontroller 5, different data items are advantageously sent from second microcontroller 4. Second micro-controller 4 sends information on its own presence by means of a synchronization signal. Thus, if second microcontroller 4 is no longer powered-on, third microcontroller 5 detects this state by the absence of a synchronization signal. Second microcontroller 4 also sends a signal indicating that the electric power system disconnection order has been initialised in order to facilitate retrieval of the electric data (step F5) by initiating data retrieval as early as possible.

In a particular embodiment illustrated in FIG. 1A, at least two communications lines are used. A first communication line 9 is used between the three microcontrollers 3, 4 and 5 advantageously for transfer of the data concerning electric power system 2. Two branches are branch-connected so that microprocessors 4 and 5 receive the same data. A synchronization line 16 connecting second microcontroller 4 and third microcontroller 5 also enables data exchange. Synchronization line 16 enables the microcontroller in charge of read of the data to be defined. In advantageous manner, so long as second microcontroller 4 is powered-on, it has priority or exclusivity to read and analyse the data provided by first microcontroller 3. Third micro-controller 5 can remain on hold or even on standby as there is no tripping of the circuit breaker. An indication line 17 indicates disconnection of the power system and the cause detected by second microcontroller 4 (steps F5 and F6) by a specific signal.

In another particular configuration illustrated in FIG. 1B, at least two different communication lines are used. A first communication line 9 is used for transfer of the data concerning electric power system 2 between first microcontroller 3 and second microcontroller 4. A second communication line 9' is used for transfer of the data concerning electric power system 2 between second microcontroller 4 and third microcontroller 5. A synchronization line 16 connecting second microcontroller 4 and third micro-controller 5 also enables data exchange. Synchronization line 16 enables the microcontroller in charge of read of the data to be defined as for the previous embodiment. In advantageous manner, so long as second microcontroller 4 is powered-on, it reads and analyses the data provided by first microcontroller 3. Third microcontroller 5 remains on hold or even on standby as there is no tripping of the circuit breaker. Indication line 17 indicates disconnection of the power system and the cause detected by second micro-controller 4 (steps F5 and F6) by a specific signal.

In the two particular cases of embodiments illustrated in FIGS. 1A and 1B, indication line 17 enables second microcontroller 4 to communicate to third microcontroller 5 for example data resulting from its analysis of electric power system 2. In this way, third microcontroller 5 does not have to continuously analyse the data concerning electric power system 2 received by communication line 9 or 9'. Advantageously, third microcontroller 5 has a standby mode in which it does not consume any electric power. In this way, monitoring device 1 enables operation in a more efficient manner in terms of electric power. Third microcontroller 5 leaves standby mode when it receives for example a start-up signal from first microcontroller 3 or from second microcontroller 4. For example on receipt of a signal indicating tripping of the circuit breaker, third microcontroller 5 will retrieve data coming from the memories (for example memory 10) which is supplied by the first and/or second microcontrollers (step F7 and F8).

In also advantageous manner, third microcontroller 5 is configured to leave standby state failing receipt of a synchronization signal. Thus, if the power delivered by the main source is insufficient, data can be stored in memories 10 and 19 even if second microcontroller 4 is inactive.

In an advantageous embodiment illustrated in FIG. 1A, first microcontroller 3 is connected to second and third microcontrollers 4 and 5 by means of two connections branch-connected on line 9. In this way, the two microcontrollers 4 and 5 receive the same data coming from first microcontroller 3.

In even more advantageous manner and as illustrated in FIG. 1A, data transfer is performed by means of a buffer memory 18. A first buffer memory 18a makes the connection between first microcontroller 3 and second micro-controller 4 and a second buffer memory 18b makes the connection between first microcontroller 3 and third microcontroller 5. There is therefore a first communication line provided with a buffer memory 18a and which connects first microcontroller 3 with second microcontroller 4. There is also a second communication line provided with a buffer memory 18b and which connects first microcontroller 3 with third microcontroller 5.

In an advantageous embodiment illustrated in FIG. 1B, first microcontroller 3 is connected to second microcontroller 4 then second microcontroller 4 is connected to third microcontroller 5 by means of two different connections respectively noted 9 and 9'. In this way, microcontroller 5 receives the data from first microcontroller 3 via second microcontroller 4.

In even more advantageous manner and as illustrated in FIG. 1B, data transfer is performed by means of a buffer memory 18. A first buffer memory 18a makes the connection between first microcontroller 3 and second micro-controller 4 and a second buffer memory 18b makes the connection between second microcontroller 4 and third microcontroller 5. There is therefore a first communication line provided with a buffer memory 18a and it connects first microcontroller 3 with third microcontroller 5. There is also a second communication line provided with a buffer memory 18b and which connects second microcontroller 4 with third microcontroller 5.

In advantageous manner in the embodiments illustrated in FIGS. 1A and 1B, second microcontroller 4 emits a synchronization signal to third micro-controller 5 to define the read priority on buffer memories 18, 18'.

In also advantageous manner, first microcontroller 3 is connected to the other two microcontrollers 4 and 5 by means of one of communication lines 9 and 9' serving the purpose of indicating transmission of a fault in the electric power system, which results in a disconnection request (steps F4 and F5). The use of one of these communication lines enables recording of the data on the causes of the disconnection to be secured.

In a particular embodiment illustrated in FIGS. 1A and 1B, third micro-controller 5 is connected to a second memory 19 in order to be able to store the data from microcontroller 5. In this way, a part of the data is recorded twice. There is a redundancy between memories 10 and 19 which enables data to be retrieved more easily in case of a problem affecting the integrity of the circuit breaker.

In advantageous manner, if third microcontroller 5 detects that memory 10 is no longer powered-on, it records the data in another memory, for example the internal memory of microcontroller 5, but the latter is however a volatile memory. It is also possible to store this data in memory 19.

In a preferred embodiment, the first second and third microcontrollers do not exchange data directly. Data exchanges are performed by means of memories which are common to two microcontrollers, for example memory 10 and/or memory 19, or by means of parallel communication lines each provided with a memory, for example buffer memories 18 of line 9 and/or line 9'.

The configuration illustrated in FIG. 1A advantageously makes it possible not to use third microcontroller 5 which can then be in a standby mode for a large part of the operating time of circuit breaker 1.

Transmission means 20 are preferably connected to second memory 19 and/or to memory 10 to make transmission of the recorded data easier. The user can receive and read the data concerning electric power system 2 without using third microcontroller 5 which enables the consumed power to be limited. For example, transmission means 20 transmit data concerning electric power system 2 by a near field communication, or by another communication based on electromagnetic waves.

It is advantageous to couple third microcontroller 5 with one or more indication devices (step F9) in order to facilitate reading of the causes responsible for tripping of the circuit breaker. Third microcontroller 5 has an indication output 21 which is configured to indicate information to the user derived from the data concerning electric power system 2. This indication can for example be performed by means of light-emitting diodes which are connected to indication output 21. Thus, in case of tripping, the user knows very rapidly whether tripping of the circuit breaker is linked to a problem of overload, voltage surge, earth leakage, an overvoltage or another incident, which quickly puts the user on the right track in his search to find the causes of the incident.

In advantageous manner, the circuit breaker comprises a clock 22 which enables the different events occurring to be date-stamped. For example, the recording is associated with a date in order to determine the chronological evolution of the different electric parameters with respect to one another.

In one embodiment, first microcontroller 3 is a microcontroller of the "Application-Specific Integrated Circuit" type which measures the current I and voltage V of electric power system 2 continuously. When it detects a fault in electric power system 2, it indicates this to second microcontroller 4 and to third microcontroller 5 and triggers interruption of the current present in electric power system 2.

Operation of monitoring device 1 can be guaranteed in two operating situations. In the first operating situation, electric power system 2 makes a large amount of electric power flow, for example a current of about or greater than 25% of the rated current of the circuit breaker, which results for circuit breaker 1 in monitoring of high values for current I and/or for voltage V. In this situation, the primary power supply is sufficient to supply all the components of management device 1. In this case, second microcontroller 4 is able to analyse the data concerning electric power system 2 and it continuously stores data related to power system 2 in memory 10 and it can consult the data stored in memory 10. Third microcontroller 5 can be in a standby mode, as second microcontroller 4 performs analysis of the data concerning electric power system 2.

In this operating situation, when first microcontroller 3 detects a fault in power system 2, it triggers disconnection of power system 2. The main power supply 7 is also interrupted as it is derived from the electric power system 2. By means of first capacitor 8, first microcontroller 3 can inform third microcontroller 5 which is supplied by back-up power supply 13.

By means of clock 22, third microcontroller 5 can date-stamp the disconnection initiated by first microcontroller 3 and store the date in second memory 19. By means of second communication line 12, third microcontroller 5 can read the data related to analysis of electric power system 2 which was written by second microcontroller 4 in first memory 10 before the fault occurred in power system 2 and during the occurrence of the fault in the power system. Third microcontroller 5 can transmit all the data to transmission means 20 which can send it to the user. Third microcontroller 5 can also send a signal corresponding to the cause of tripping via indication output 21 to inform the user, for example by means of several light-emitting diodes. All the data related to power system 2 is thus transmitted to the user.

In a particular operating mode that is able to be combined with the other operating modes, clock 22 is shared by third microcontroller 5, second micro-controller 4 and first microcontroller 3. As a variant, each microcontroller can be associated with a specific clock or a clock can be common to two micro-controllers.

In the second operating situation, electric power system 2 makes a weak electric current flow, for example less than 20% of the rated current of the circuit breaker. Consequently, primary power supply 7 is not sufficient for operation of second microcontroller 4. In this case, first microcontroller 3 sends the data concerning the electric power system to third microcontroller 5. If first microcontroller 3 detects a fault of electric power system 2, only third microcontroller 5 can analyse the cause of the fault and store the data concerning power system 2.

As indicated in the foregoing, it is advantageous to have a third micro-controller 5 provided with a standby state in which the consumption is extremely reduced or zero. As third microcontroller 5 is not used for analysis of the operating conditions of the power supply line, it is on standby most of the time.

In advantageous manner, third microcontroller 5 is configured so as to leave a standby state on receipt of a signal from the first and/or second micro-controller indicating an activity of electric power system 2 or detection of an electric fault. Thus, in normal operation of the circuit breaker for monitoring of the power system, third microcontroller 5 is in standby state, and when an activity or an electric fault is detected, third microcontroller 5 is activated in order to retrieve the relevant information before final disconnection of the other two microcontrollers 3 and 4.

In the embodiments illustrated in FIGS. 1A and 1B, the microcontrollers and memories are supplied between the same reference voltage 23 which is the ground here and a voltage derived from the primary power supply. As a variant, it is possible to use different reference voltages for each micro-controller and/or for each memory.

In an advantageous embodiment, it is possible to activate third micro-controller 5 in periodic manner or on an order from the user to perform one or more other functions.

In a particularly advantageous embodiment, monitoring device 1 comprises a management system of discharge of battery 13. It has in fact been discovered that in certain cases, on actuation of the circuit breaker, the battery is no longer powerful enough to supply third microcontroller 5.

Figure 2:
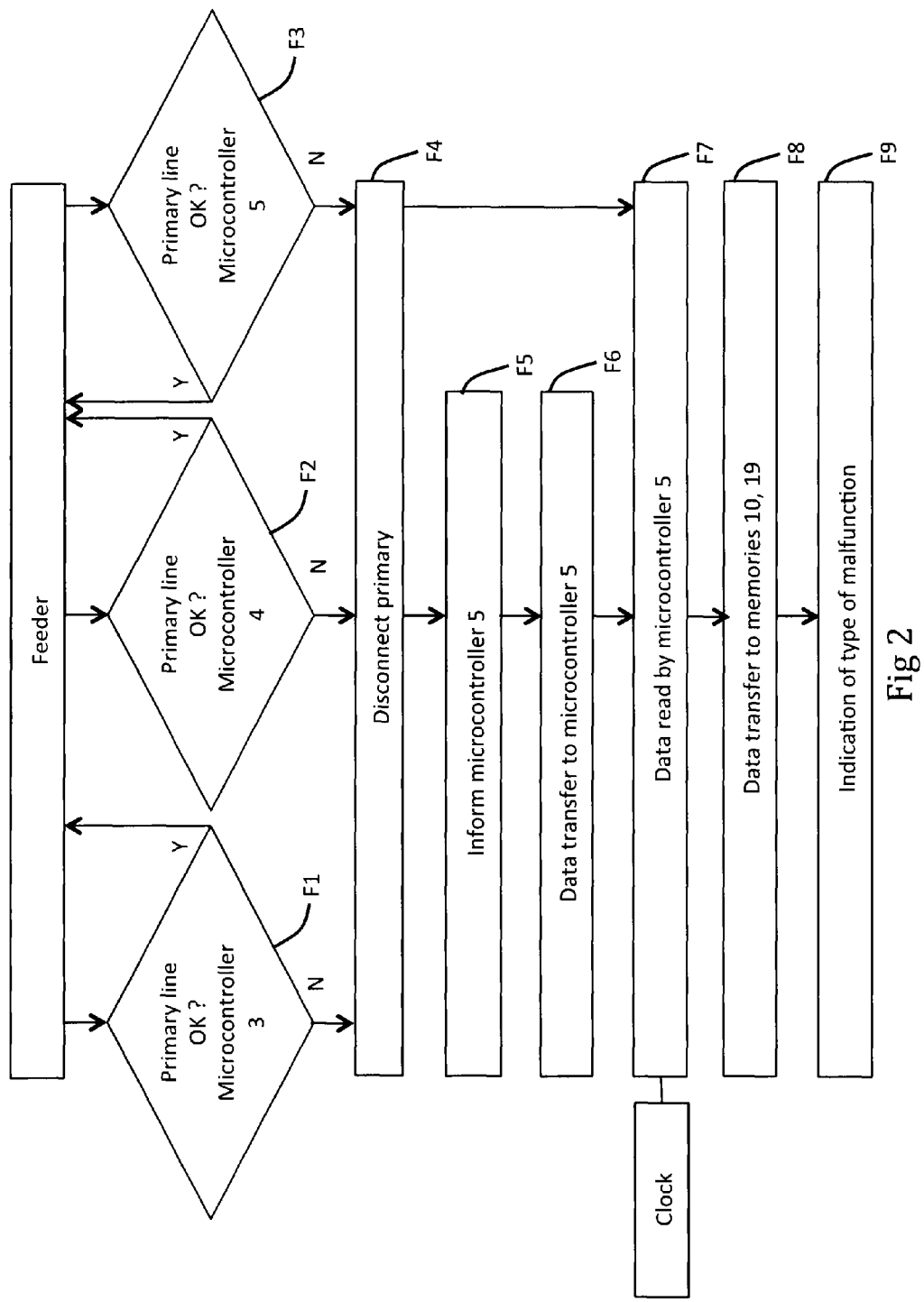
FIG. 2 illustrates a flowchart with the main actions performed by the circuit breaker.

The operation described in the foregoing can be summed up in FIG. 2. First and second microcontrollers 3 and 4 and possibly third microcontroller 5 perform analysis of the electric quantities of electric power system 2 (steps F1, F2 and F3). The electric power system is noted "primary line".

If at least one of the microcontrollers detects an anomaly on electric power system 2, it sends a signal which is, for a circuit breaker, the order to disconnect the power supply. The power supply is interrupted in a step F4 and the same is therefore the case for the primary power supply of the circuit breaker. At the same time as or consecutively to the disconnection order, information is transmitted by first microcontroller 3 and/or by second micro-controller 4 to third microcontroller 5 in order to inform of disconnection of the power supply (step F6). As indicated previously, third microcontroller 5 retrieves the relevant data concerning the electric power system (step F7) from the first and second microcontrollers and/or from buffer memories 18 of the communication lines and/or from memories 10 and 19. The collected and possibly analysed data is transferred to memory 10 and possibly to memory 19 (step F8). In addition to recording, the device indicates the type of malfunction that caused disconnection of the electric power system (step F9).

As indicated in the foregoing, in a particularly advantageous embodiment, the monitoring device comprises a management device of discharge of battery 13. It has in fact been observed that in certain situations, when tripping of the circuit breaker takes place, battery 13 was not able to supply power to third microcontroller 5. In a standard configuration, the circuit breaker is not designed to trip regularly, and it is rare to use the back-up power supply. It is therefore important in this exceptional situation for the monitoring device to be able to assist the user in troubleshooting to find the cause of the electric fault.

FIG. 3A illustrates a monitoring device 1, for example a circuit breaker, configured to monitor one or more electric power supply lines. Monitoring device 1 is designed to be connected to the electric power supply lines and is configured to measure the electric characteristics of the lines, for example the voltage present on the line and/or the current flowing in the electric line. In the case of a circuit breaker, disconnection of the monitored power supply line can occur in case of detection of a malfunction.

Monitoring device 1 comprises a series of power supply terminals designed to be connected to a primary power supply source 2. The primary power supply source is the main power supply source, i.e. it mainly or as a priority supplies power to the different components of monitoring device 1.

In order to palliate a deficiency of primary power supply source 2, monitoring device 1 comprises a back-up power supply source 13 which is formed by a battery. Battery 13 is provided with two contacts 13a which connect battery 13 to the components of monitoring device 1. In advantageous manner, all the electronic circuitry or only a part of the electronic circuitry of monitoring device 1 is supplied by battery 13 in order to keep a large autonomy in case of unavailability of main power supply 2. In advantageous manner, battery 13 supplies at least a storage circuit 24 which records indicators linked to the measured electric quantities. In the case of a circuit breaker, storage circuit 24 preferably records indicators linked to the causes of tripping of the circuit breaker.

Back-up power supply source 13 is placed in monitoring device 1 so as to prevent fitting of a new series of power supply lines dissociated from the first series of power supply lines. In this way, it is possible to have a monitoring device 1 which is compact and which ensures almost permanent operation.

As monitoring device 1 is placed in aggressive environments, it is advantageous to have a back-up power supply source 13 which is also able to withstand such conditions.

In an advantageous embodiment, monitoring device 1 is configured so that primary power supply source 2 is the power supply line to be monitored or is linked to the power supply line to be monitored. The power supply line to be monitored is designed to supply one or more other electric loads. If monitoring device 1 detects a malfunction on the power supply line, it will cause disconnection of the line which will result in outage of primary power supply source 2.

Thus, in this configuration, when the power supply line to be monitored is shut down, main power supply 2 is lacking and it is necessary to switch over to back-up power supply 13.

As represented in FIG. 3A, monitoring device 1 comprises a control circuit represented here by at least microcontrollers 4 and 5. This control circuit is configured to analyse the power supply line to be monitored. Storage circuit 24 is coupled to the control circuit. In the embodiment illustrated in FIGS. 3A and 3B, storage circuit 24 forms part of the control circuit and advantageously forms part of third microcontroller 5.

Battery 13 is configured to supply the control circuit or a part of the control circuit (in particular storage circuit 24) in case of failure of main power supply 2. The battery advantageously supplies third microcontroller 5 which enables good performances of monitoring device 1 to be ensured.

Monitoring device 1 further comprises a management circuit 25 configured to analyse the state of battery 13 and to detect a possible malfunctioning of battery 13.

The use of a management circuit 25 which checks the state of battery 13 makes it possible to know, in the course of time, whether back-up power supply source 13 is able to supply storage circuit 24 and advantageously third microcontroller 5, and therefore to ensure satisfactory operation of monitoring device 1 when the main power supply is unavailable.

Measuring means 26 are configured to measure the voltage $V_{bat}$ at the terminals of battery 13. Measuring means 26 are connected to an input of a comparator 27 to provide it with information on the state of battery 13 by means of the voltage $V_{bat}$.

Figure 5:
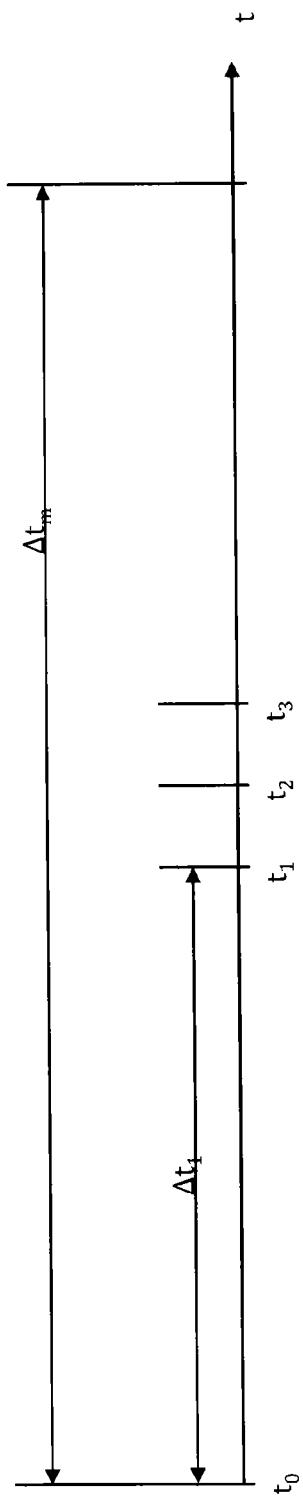
FIG. 5 represents the times and the cycles sequencing the variations of the current emitted by the battery in the scope of a battery discharge management method.

Measuring means 26 can be configured to perform measurement of the voltage at the terminals of battery 13 in periodic manner, a period symbolised by $\Delta t_m$, in FIG. 5, for example by means of clock 22. It is also possible to perform measurement of battery 13 on receipt of a measurement signal. The term measured voltage $V_{bat}$ can represent the voltage at the terminals of battery 13 or a quantity representative of this voltage. In a particular embodiment, the voltage at the terminals of the battery $V_{bat}$ is measured every 24 h, i.e. $\Delta t_m = 24$ h.

The comparator 27 is configured to compare the measured voltage $V_{bat}$ with a first threshold $V_{OFF}$ and with a second threshold $V_{min}$. The second threshold $V_{min}$ is higher than the first threshold $V_{OFF}$.

The value of the second threshold $V_{min}$ corresponds to a functional battery 13. Thus, if the measured voltage $V_{bat}$ is higher than the second threshold value $V_{min}$, comparator 27 emits first data representative of this comparison and battery 13 is considered to be functional by the management circuit.

The interval comprised between the first threshold value $V_{OFF}$ and the second threshold value $V_{min}$ corresponds to a battery 13 that may present a problem that is able to be corrected. Thus, if the measured voltage $V_{bat}$ is comprised within this interval, comparator 27 sends associated second data to the management circuit.

The value of the first threshold $V_{OFF}$ corresponds to a defective battery 13 that is unable to be repaired. Thus, if the measured voltage $V_{bat}$ is lower than the first threshold value $V_{OFF}$, comparator 27 emits third data representative of this comparison and battery 13 is considered to be defective. Battery 13 has for example to be replaced.

The data emitted by comparator 27 is sent to management circuit 25. If management circuit 25 receives the first data, it can store this data in a memory.

If management circuit 25 receives the third data, it can inform the user that battery 13 is defective and that replacement of the latter is to be scheduled in order to maintain operation of monitoring device 1 with all its performances. Indication of a defective battery 13 can be performed by means of a light indicator, for example by means of a light-emitting diode. It is also possible to use an electromagnetic wave or an electronic signal to inform the user of failure of battery 13. For example, management circuit 25 indicates the end of life of battery 13 by means of an output 21 or another dedicated output.

If management circuit 25 receives the second data, it engages a test protocol in order to determine whether battery 13 is functional or defective.

Management circuit 25 is coupled to an electric load 28 configured to discharge battery 13. Under these conditions, an electric current flows from battery 13 to electric load 28 (through terminals 13a of battery 13).

Partial discharge of battery 13 is thus triggered when the measured voltage $V_{bat}$ at terminals 3a of battery 13 is higher than the first threshold $V_{OFF}$ and lower than the second threshold $V_{min}$.

Discharge of battery 13 is triggered by management circuit 25 which defines the discharge conditions, for example the current intensity, the current duration, the quantity of electric charges transferred by battery 13, the form of the current in time (intensity versus time) and/or the number of repetitions of a discharge current defining a pattern.

A discharge current $I_d$ is emitted from battery 13, and the discharge current $I_d$ is configured to at least partially eliminate a passivation layer present on a terminal or one of the internal electrodes of battery 13.

For example, the discharge current $I_d$ is in the form of several pulses of square shape.

In one embodiment, management circuit 25 is connected to the control electrode of a switch 29. Switch 29 electrically connects the two terminals 13a of battery 13 or it connects one of the terminals 13a of battery 13 to a reference potential 23 which is able to drain the electric loads. This embodiment is advantageous as it is compact and enables flow of the current from battery 13 to be easily controlled.

In an even more particular embodiment, switch 29 is a transistor. Transistor 29 enables a discharge current $I_d$ to transit from the anode of battery 13 to the reference potential 23 through electric load 28. The reference potential 23 is for example the ground. The use of a transistor 29 associated with electric load 28 enables an extremely compact device to be achieved while at the same time allowing a good control of the quantity of current to be made to transit. Transistor 29 enables the current flow duration to be fixed and electric load 28 enables the current intensity to be fixed.

Monitoring device 1 advantageously comprises a counter 30 which is configured to measure a quantity representative of the flow of electrons.

For example, monitoring device 1 advantageously comprises a counter 30 which is configured to measure the quantity of current flowing through terminals 13a of battery 13 or to measure the number of iterations of application of current flowing through terminals 13a of battery 13. Counter 30 can be a counter which receives data from management circuit 25 indicating tripping of a discharge current $I_d$. Counter 30 then records the number of iterations of application of discharge current $I_d$. Counter 30 can also be a counter measuring activation of the control electrode of switch 29. Counter 30 can further be a measurement device of current $I_d$ flowing through battery 13. The recorded data is then a quantity of electrons that have transited via terminals 13a of battery 13.

In a particular embodiment, management circuit 25 is connected to counter 30. Management circuit 25 is configured to indicate failure of battery 13 if the second data is sent by comparator 27 and if counter 30 presents a value higher than a critical value $N_C$. Under these conditions, it has been detected that the voltage $V_{bat}$ at the terminals of battery 13 is within the interval where the test protocol has to be applied and counter 30 indicates that the test protocol has already been applied several times. It therefore seems that the voltage drop is not linked to a passivation layer or that the flow of a current at the terminals of battery 13 is not sufficient to break the passivation layer. Emission of a failure signal makes it possible to anticipate an aggravation of the situation where battery 13 will no longer be able to supply a sufficient voltage to supply the control circuit, the third microcontroller or at least storage circuit 24.

This configuration makes it possible to detect a battery 13 which will not be functional more rapidly and this enables certain passivated batteries 13 to be reactivated without requiring the intervention of a user.

In a particular embodiment, measurement circuit 26 is configured to measure the voltage $V_{bat}$ at the terminals of battery 13 as soon as a battery 13 has just been installed.

Under these conditions, a newly fitted battery 13 is automatically detected which enables the user to immediately know whether the new battery 13 intrinsically presents a problem. The situation where a user who has just fitted a new battery has to come back to change this battery which is defective is thus avoided.

Measurement circuit 26, comparator 27 and management circuit 25 can be achieved by distinct electronic circuits or they can be at least partially achieved in one and the same electronic circuit for example the control circuit and particularly by a microcontroller.

The use of a microcontroller to form at least a part of management circuit 25, of measurement circuit 26, of comparator 27 and/or of counter 30 is advantageous as this enables a compact device with low power consumption to be achieved.

In a particular configuration represented in FIG. 3b, primary electric power source 2 applies a supply voltage $V_{dd}$ to monitoring device 1 via a first diode 31. This configuration is particularly advantageous when the primary power supply originates from the power supply line to be monitored which is an AC or DC power supply.

Voltage $V_{dd}$ is applied to the anode of first diode 31. First diode 31 is arranged to supply management circuit 25. The cathode of first diode 31 is here connected to the input of third microcontroller 5.

In an advantageous embodiment, first diode 31 is also connected to a first terminal of a decoupling capacitor 32 configured to smooth the voltage applied by the power supplies. A second terminal of decoupling capacitor 32 is connected to the reference potential 23, here the ground. Power supply of management circuit 25 by primary power source 2 enables the electric battery electric 13 to be economised, the latter only coming into operation in case of failure of primary source 2.

The same is advantageously the case for the other components involved in monitoring the state of battery 13, i.e. measurement circuit 26, counter 30 and comparator 27.

The anode of battery 13 is connected to the source of transistor 29. Management circuit 25 applies a voltage $V_{pol}$ on the gate of said transistor 29, which enables flow of a current from battery 13 (FIG. 3b) to be controlled.

In the illustrated example, the drain of transistor 29 is connected to the anode of a second diode 31'. The cathode of diode 31' is connected to the input of the control circuit and here more precisely to the input of the third microcontroller. The electric connection between the two diodes 31 and 31' with decoupling capacitor 32 defines a second node $N_2$. Transistor 29 is for example a P-type MOSFET transistor.

In an advantageous embodiment, supply voltage $V_{dd}$, supplied by primary power supply 2 is about 3.3V with a tolerance of plus or minus 5%. The electric voltage $V_{bat}$ of battery 13 is about 3.6V for a fully charged battery 13.

In one embodiment, decoupling capacitor 32 is a capacitor having a capacitance of about $C_d$=1 µF.

In a particular configuration, first diode 31 and second diode 31' are Schottky or silicon diodes having a low forward voltage.

In a particular operating mode illustrated in FIG. 3b, the discharge current flows through third microcontroller 5. Electric load 28 is connected between third microcontroller 5 and reference voltage 23. An electric resistance of about 1 kΩ can for example be used to form electric load 28. In this case, a discharge current $I_d$ of about 3 mA is advantageous to ensure degradation of the passivation layer. The discharge current is advantageously equal to 3 mA, which corresponds with the embodiment variations to a current comprised between 2.7 and 3.3 mA.

In this configuration, a first electric node $N_1$ is defined by the connection of the anode of battery 13 with the terminal of the source of transistor 29 and the power supply input of control circuit 4. The voltage $V_{bat}$ of battery 13 can be measured at node $N_1$ by measuring means 26. A second electric node $N_2$ is defined by the connection of the cathode of first diode 31 with the cathode of second diode 31' and the second input of third microcontroller 5. A terminal of decoupling capacitor 32 is also connected to node $N_2$.

Figure 4:
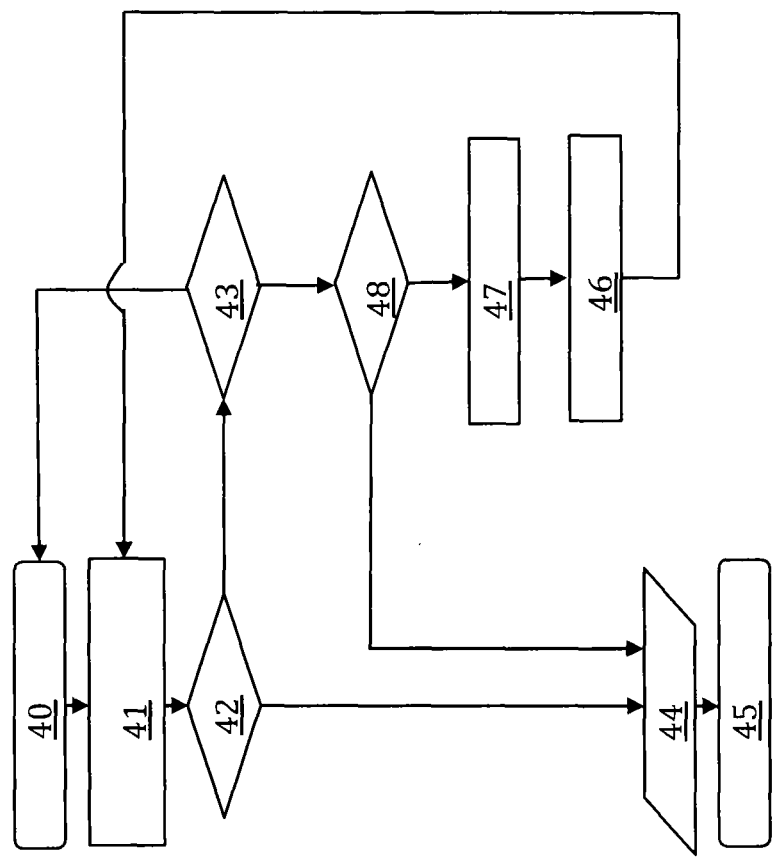
FIG. 4 represents a flowchart of the steps for management of the state of the battery.

In operation, monitoring device 1 can apply the monitoring protocol of the state of battery 13 which follows and which is illustrated in FIG. 4.

The beginning of the process is represented by step 40, battery 13 is present and monitoring device 1 is supplied either by battery 13 or by power supply source 2. Step 40 can be considered as being a standby state.

A measurement order is emitted to initiate measurement of the voltage $V_{bat}$ at terminals 13a of battery 13. A discharge current $I_d$ is then advantageously applied to battery 13 through load 28 in order to break the passivation layer and to make on-load voltage measurements.

In a step 41, the voltage $V_{bat}$ at the terminals of battery 13 is measured by measuring means 26. Measurement of the voltage $V_{bat}$ can preferably be made by multiple successive measurements, which enables for example a mean of the voltage $V_{bat}$ to be calculated in order to obtain a more reliable value of $V_{bat}$. The discharge current $I_d$ is then interrupted.

In a step 42-43, the measured voltage $V_{bat}$ is compared with the first and second threshold values $V_{min}$ and $V_{OFF}$.

In step 42, the measured voltage $V_{bat}$ is compared with the first threshold value $V_{OFF}$ ($V_{bat}$<$V_{OFF}$ ?).

If the voltage $V_{bat}$ is lower than the first threshold value $V_{OFF}$ ($V_{bat}$<$V_{OFF}$), battery 13 is considered to be defective (step 44) and it is advantageous to replace it.

Advantageously, detection of the defective state is associated with indication of this state to the user (step 45).

Following this indication event, the management method can be terminated by a waiting phase for replacement of battery 13. Indication can be made, for example, with an advantageously discrete signal sent by output 41 to a light-emitting diode or with a digital or analog signal sent to another component of the monitoring device. In a particular embodiment, the threshold value $V_{OFF}$ is equal for example to 2.3V.

If the voltage $V_{bat}$, in step 42, is higher than the first threshold value $V_{OFF}$ ($V_{bat} > V_{OFF}$), the measured voltage $V_{bat}$ is compared with the second threshold value $V_{min}$. In step 43, the measured voltage $V_{bat}$ is compared with the second threshold value $V_{min}$ ($V_{bat} > V_{min}$ ?).

If the voltage $V_{bat}$ is higher than the second threshold value $V_{min}$ ($V_{bat} > V_{min}$), battery 13 is considered to be functional. This data can be stored in memory.

The management method then reverts to a waiting state (step 40) or it performs another measurement step of the voltage $V_{bat}$ (step 41). In advantageous manner, the monitoring method reverts to the initial state 40 and waits for a new measurement order in order to avoid placing too great a load on battery 13.

If the voltage $V_{bat}$ is lower than the second threshold value $V_{min}$ ($V_{bat} < V_{min}$), this means that the voltage $V_{bat}$ is within the voltage interval comprised between the first threshold value $V_{OFF}$ and the second threshold value $V_{min}$. Battery 13 may present a problem that is able to be corrected.

An additional test protocol of battery 13 is engaged (step 46). A discharge current $I_d$ is again applied on battery 13 through load 28 in order to break the passivation layer. In advantageous manner, with the application of a discharge current $I_d$, counter 30 is incremented in order to know the number of occurrences of this type of problem (step 47).

The counter is configured to record the number of iterations of activation of the discharge current $I_d$. As indicated in the above, the counter records data representative of the number of iterations (n). It is therefore possible to record a time, an electric load, the number of iterations made or another quantity.

Incrementation of counter (step 47) can be performed before step 46, during step 46 or after step 46.

After a certain application period of discharge current $I_d$, the voltage $V_{bat}$ at the terminals of battery 13 is measured again (step 41) in order to measure the evolution of the voltage $V_{bat}$.

As previously, the measured voltage $V_{bat}$ is compared with the first and second voltage values (steps 42 and 43).

If the voltage $V_{bat}$ is higher than the second threshold value $V_{mm}$ ($V_{bat} > V_{min}$), battery 13 is considered to be functional. This data can be stored in memory and it is advantageous to reinitialise counter 30.

If the voltage $V_{bat}$ is lower than the first threshold value ($V_{bat} < V_{OFF}$), battery 13 is considered to be defective and it is advantageous to replace it. The protocol described above can be applied.

If the voltage $V_{bat}$ is within the voltage interval comprised between the first threshold value $V_{OFF}$ and the second threshold value $V_{min}$, it is possible to generate a discharge current $I_d$ again.

In order to avoid repetition of the discharge current $I_d$ at the terminals of battery 13 until the voltage $V_{bat}$ is lower than the first threshold value $V_{OFF}$, it is advantageous to introduce a comparison step 48 of the value recorded in counter 30 with a critical value $N_C$ ($n < N_C$?). Here again the position of step 48 with respect to steps 46 and 47 is of little importance.

Once the limit value $N_C$ has been reached, it is considered that battery 13 can no longer be repaired and the battery is considered to be defective (step 44). The failure protocol is advantageously applied in order to inform the user.

Thus, if the measured voltage $V_{bat}$ is comprised between the first and second threshold values, it is advantageous to make a comparison of the value of the counter with a critical value (step 48) in order to determine whether battery 13 is defective or if a discharge current can improve the situation. This constitutes an additional criterion enabling a defective battery to be detected.

Steps 42 and 43 can be inverted in so far as it is possible to determine whether the voltage $V_{bat}$ is lower than the first threshold value $V_{OFF}$, higher than the second threshold value $V_{min}$ or in the interval indicated in the foregoing.

In an advantageous embodiment, the management protocol comprises a repetition of certain steps in periodic manner in order to monitor the evolution of the state of battery 13 with time. Advantageously, measurement of the voltage $V_{bat}$ at terminals 13a of battery 13 is performed in periodic manner.

In an advantageous embodiment, the management protocol is triggered when a new battery 13 is connected to monitoring device 1. In this way, the user knows quickly whether the battery 13 is functional or defective.

It is also possible to force the measurement protocol, for example by means of a user action either by pressing a push-button 33 or by making use of a communication interface.

In a particular operating mode, measurement of the voltage $V_{bat}$, made during step 41, can be described schematically in the manner represented in FIG. 5. In the embodiment illustrated in FIG. 5, measurement of the voltage is performed in cyclic manner. The period is equal to the time $\Delta t_m$.

If battery 13 is considered to be functional, i.e. if the measured voltage is higher than the threshold $V_{min}$, it is advantageous to perform voltage measurement with a first period $\Delta t_{min}$, for example equal to 24 h. If on the other hand battery 13 is considered as being potentially defective, i.e. if the measured voltage is lower than the threshold $V_{min}$ but higher than the threshold $V_{OFF}$, it is advantageous to perform voltage measurement with a second period $\Delta t_{m2}$, for example equal to 19 minutes.

In advantageous manner, when the voltage at the terminals of battery 13 is measured within the interval defined by the voltages $V_{min}$ and $V_{OFF}$, a discharge current $I_d$ is applied and the voltage $V_{bat}$ is measured after a predefined waiting period which follows on from stopping of the discharge current $I_d$.

During the period $\Delta t_{m2}$, a discharge phase with a current equal to $I_d$ is applied. This periodic discharge phase enables the terminals of the battery to be made to work to reduce formation of a passivation layer.

In preferential manner, the voltage measurements are performed after a first waiting time $\Delta t_1$, for example at least equal to 48 ms. This first waiting time corresponds to the time separating the end of application of the current $I_d$ and the first measurement of the voltage $V_{bat}$. The first waiting time enables the voltage measurement to be reliabilized. It is also possible to measure the voltage $V_{bat}$ when the current $I_d$ is flowing. Here again, it is advantageous to perform voltage measurement in stationary operating conditions, for example after the first waiting time $\Delta t_r$.

As indicated in the foregoing, to obtain a more accurate measurement of the voltage $V_{bat}$ at the terminals of the battery, several voltage measurements are preferably made. For example, three voltage measurements are made.

These measurements are made at times $t_1$, $t_2$ and $t_3$ in FIG. 5. The three measurements can be separated by the same rest period or it is possible to apply a different rest period between the first and second measurements and between the second and the third measurements.

In an operating mode giving good results, a waiting time at least equal to 2 ms is present between two successive voltage measurements.

During the period $\Delta t_m$, there is a discharge phase where the current $I_d$ is applied and a rest phase. During the rest phase, a second current can be applied. The second current is lower than the first current $I_d$. The second current is advantageously less than half the first current $I_d$ (in absolute value). It is also possible to have a zero second current during the rest phase.

As a variant, during the discharge phase, the discharge current $I_d$ is a periodic current with an alternation of discharge periods at a first current and of rest periods at a second current lower than the first current (in absolute value) or at zero current.

For example, in FIG. 5, during the period $\Delta t_m$, there is a discharge phase with a current equal to $I_d$ from $t_0$ to $t_3$ and a rest phase at a much lower current of $I_d$ from $t_3$ to the end of the period $\Delta t_m$.

For example purposes, good experimental results have been obtained with a period $\Delta t_m$ equal to 19 seconds and a phase $t_0$ to $t_3$, where the current is equal to Id, equal to 50 milliseconds for monitoring of the voltage $V_{bat}$ and depassivation of the battery.

Figure 6:
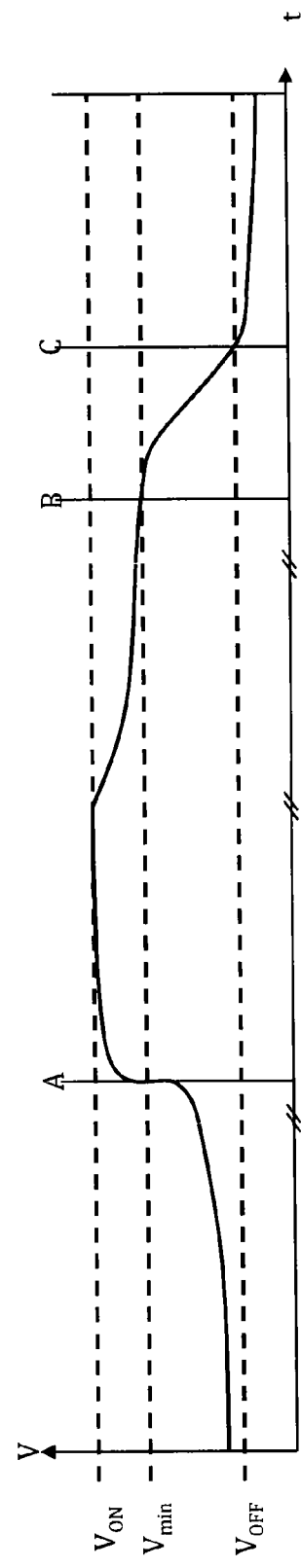
FIG. 6 represents examples of the variation versus time of the electric voltage measured at the terminals of the battery.

For example purposes, the evolution of the voltage at the terminals of the battery is represented in FIG. 6. Until the time A, the measured voltage $V_{bat}$ is comprised between the voltages $V_{OFF}$ and $V_{min}$. There is a doubt on the state of the battery which may be functional but passivated. Until the time A, a discharge current is applied from battery 13.

From time A up to time B, the voltage $V_{bat}$ is higher than the voltage $V_{min}$ and battery 13 is considered to be functional. Measurement of the voltage $V_{bat}$ is performed periodically.

From time B up to time C, the voltage $V_{bat}$ is comprised between the voltage $V_{min}$ and the voltage $V_{OFF}$. A discharge current is again applied.

From time C on, the voltage $V_{bat}$ is lower than the voltage $V_{OFF}$ and the battery 13 is considered to be defective.

A device is thus provided which is efficient, simple to produce, and particularly suitable for the state of a power supply battery 13 of a storage circuit 24.

The invention claimed is:

1. A circuit breaker comprising
a series of inputs designed to be connected to a first microcontroller configured to measure characteristics of an electric current of a power supply line to detect an electric fault of the power supply line,
a second microcontroller supplied by said power supply line and presenting a first electricity consumption value, the second micro-controller being configured to analyse data coming from the first microcontroller in order to detect an electric fault of the power supply line,
a third microcontroller supplied by said power supply line and connected so as to receive data from the first and second micro-controllers, the third microcontroller being configured to indicate a cause of tripping of the circuit breaker, the third microcontroller presenting a second electricity consumption lower than the first electricity consumption value,
a back-up power supply source configured to supply the third microcontroller in case of unavailability of the power supply line.

2. The circuit breaker according to claim 1, wherein the third microcontroller is configured so as to leave a standby state on receipt of a signal from the first and/or second microcontrollers indicating detection of the electric fault of the power supply line.

3. The circuit breaker according to claim 1, wherein:
the first microcontroller is connected to the second microcontroller by means of a first communication line comprising a first buffer memory separating the first and second microcontrollers,
the second microcontroller is connected to the third microcontroller by means of a second communication line comprising a second buffer memory separating the second and third microcontrollers,
the second microcontroller emits a synchronization signal to the third microcontroller to define a read priority on said first and second buffer memories.

4. The circuit breaker according to claim 1, wherein
the first microcontroller is connected to the second microcontroller by means of a first communication line comprising a first buffer memory,
the first microcontroller is connected to the third microcontroller by means of a second connection line branch-connected on the first communication line, the second connection line comprising a second buffer memory,
a synchronization signal is emitted by the second microcontroller to the third microcontroller to define a read priority on the first and second buffer memories.

5. The circuit breaker according to claim 1, wherein the second and third microcontrollers are connected to a first memory and wherein a synchronization signal is emitted by the second microcontroller to the third microcontroller to define a read priority on said first memory.

6. The circuit breaker according to claim 5, wherein the first memory is of electrically erasable and programmable non-volatile memory type or of random access memory with permanent magnetic recording type and has a back-up power supply formed by a capacitor.

7. The circuit breaker according to claim 2, wherein the third microcontroller is configured to leave a standby state when failing receipt a synchronization signal.

8. The circuit breaker according to claim 1, wherein the second and/or third microcontrollers are connected to a second memory, the second memory being connected to near field communicator.

9. The circuit breaker according to claim 1, wherein the second microcontroller and the first microcontroller each have a back-up power supply formed by a capacitor.

10. The circuit breaker according to claim 1, wherein the first microcontroller is supplied by means of said power supply line.

* * * * *